United States Patent
Hernandez-Maldonado et al.

(10) Patent No.: US 8,440,166 B1
(45) Date of Patent: May 14, 2013

(54) METHOD OF SYNTHESIZING A NOVEL ABSORBENT TITANOSILICATE MATERIAL (UPRM-5)

(75) Inventors: Arturo Hernandez-Maldonado, Mayaguez, PR (US); Jose N Primera-Pedrozo, Mayaguez, PR (US)

(73) Assignee: University of Puerto Rico, San Juan, PR (US)

(*) Notice: Subject to any disclaimer, the term of this patent is extended or adjusted under 35 U.S.C. 154(b) by 0 days.

(21) Appl. No.: 13/071,465

(22) Filed: Mar. 24, 2011

Related U.S. Application Data

(60) Provisional application No. 61/316,911, filed on Mar. 24, 2010.

(51) Int. Cl.
*C01B 39/04* (2006.01)
*C01B 39/00* (2006.01)

(52) U.S. Cl.
USPC ........... 423/702; 423/700; 423/701; 423/703; 423/704; 423/705; 423/710; 423/711; 423/712; 423/713; 423/714; 423/715; 423/716; 423/717; 423/718

(58) Field of Classification Search ........... 423/700–718
See application file for complete search history.

(56) References Cited

U.S. PATENT DOCUMENTS

| | | | |
|---|---|---|---|
| 4,021,447 A * | 5/1977 | Rubin et al. | 548/402 |
| 5,244,650 A * | 9/1993 | Kuznicki et al. | 423/718 |
| 6,068,682 A * | 5/2000 | Kuznicki et al. | 95/130 |
| 6,127,307 A * | 10/2000 | Muller et al. | 502/162 |
| 2005/0037209 A1* | 2/2005 | Tsapatsis et al. | 428/446 |
| 2005/0209091 A1* | 9/2005 | Tatsumi et al. | 502/64 |
| 2007/0154388 A1* | 7/2007 | Muller et al. | 423/700 |
| 2007/0243129 A1* | 10/2007 | Bell et al. | 423/716 |
| 2009/0187053 A1* | 7/2009 | Kuznicki et al. | 585/6 |
| 2011/0201861 A1* | 8/2011 | Bulut et al. | 585/446 |

OTHER PUBLICATIONS

Kim, Wha J., et al., Compositional and kinetic studies on the crystallization of ETS-10 in the presence of various organics, 2002, Microporous and Mesoporous Materials, 56, pp. 89-100.*

Rizzo (Synthesis, characterization and adsorption capacities of microporous titanosilicate EMS-3, Microporous and Mesoporous Materials 2006, 90: 153-161).*

Pavel et al (Synthesis and Characterization of the microporous titanosilicates ETS-4 and ETS-10, Microporous and Mesoporous Materials 2002, 56: 227-239).*

Liu et al (Sythesis and characterization of a novel microporous titanosilicate JLU-1, Chem. Mater. 2000, 12: 665-670).*

* cited by examiner

*Primary Examiner* — Jun Li
(74) *Attorney, Agent, or Firm* — Hoglund & Pamias, PSC; Roberto J. Rios

(57) ABSTRACT

A titanium silicate variant named UPRM-5 was prepared using tetraethylammonium hydroxide as a structure-directing agent (SDA). Successful detemplation was achieved via ion exchange with $NH_4Cl$. Effective functionalization was obtained after ion exchanging the detemplated material using $SrCl_2$ and $BaCl_2$. Adsorption of $CO_2$ at 25° C. in Sr- and Ba-UPRM-5 materials activated at different temperatures. For low partial pressures, the observed $CO_2$ adsorption capacities increased as follows: $NH_4$-UPRM-5<Sr-UPRM-5<Ba-UPRM-5. Both the Sr- and Ba-UPRM-5 materials exhibited outstanding selectivity for $CO_2$ over $CH_4$, $N_2$ and $O_2$.

4 Claims, 4 Drawing Sheets

METHOD OF SYNTHESIZING A NOVEL ABSORBENT TITANOSILICATE MATERIAL (UPRM-5)

GOVERNMENT INTEREST

The claimed invention was made with U.S. Government support under grant number HRD-0833112 awarded by the US National Science Foundation (NSF) and grant number NNX09AV05A awarded by the National Aeronautics and Space Administration (NASA). The government has certain rights in this invention.

BACKGROUND OF THE INVENTION

Environmental contamination due to high emission levels of greenhouse gases like carbon dioxide ($CO_2$) continues to escalate. Sources include industrial fuel processes and fossil fuel burning, which remain the largest contributors despite implementations of gas capture technologies to remove $CO_2$. The quandary is also reaching levels that are more complex as the world energy crisis has called the attention of many scientists and engineers to develop alternatives to petroleum based fuels. One of these options includes increasing natural gas production, but the presence of considerable amounts of nitrogen ($N_2$) and $CO_2$ in the natural gas effluents has raised questions regarding energy density when compared to other alternatives. The latter contaminant could be removed via chemical adsorption, pressure swing adsorption, membrane separation and cryogenic distillation, but these strategies are either energy intensive or involve expensive operational processes.

The challenges associated to $CO_2$ removal from gas mixtures are not exclusive to energy-related applications. With the prospective space exploration long-term missions, the need for better $CO_2$ ultra-purification systems is going to be a critical aspect. Although the breathing air that ought to be supplied to the spacecraft cabins will require ultra-low $CO_2$ concentrations, the most important challenge is to find a process that provides uninterrupted air purification with minimal onboard energy and work impact. One possible solution to all of the aforementioned problems is the use of enhanced adsorption processes, including development of sorbent materials with pore-window tailoring capabilities, large pore volume and with outstanding $CO_2$ selectivity under physisorption level interactions. The last criterion is critical for ease of regeneration, especially in space related applications.

For many years, Zeolite-like materials have been considered for $CO_2$ removal from gas mixtures. One of these materials include one synthesized by Kuznicki and co-workers during the 1990s called Engelhard Titanium Silicate variant number 4 (ETS-4), which was obtained by using hydrothermal synthesis and exhibited a pore size between 3 and 4 angstroms. Several studies have found that the structure of ETS-4 is similar to the one of exhibited by the Zorite mineral, the key difference being the chemical composition. This material contains tetrahedral coordinated silicon and both square-pyramidal/octahedrally coordinated titanium framework atoms and was the first molecular sieve ever to exhibit such atomic arrangement. Depending on the activation (degas) temperature, a structural contraction or shrinkage is obtained. The final pore dimensions depend on the amount of structural water that has been removed from the sorbent material. It should be mentioned that this material has been used for $CO_2$ adsorption from natural gas mixtures, and it has been reported that it has a substantial selectivity of $CO_2$ over $CH_4$, $N_2$, $O_2$ and Ar.

The adsorbed amounts in ETS-4 could be further increased by employing ion exchange methods, where extra-framework cations (monovalent or divalent) are incorporated and serve as unique adsorption sites. Cations also play an important role in the material phase when employed in hydrothermal synthesis since they are considered an important factor in the final crystallinity, morphology and yield. For instance, sodium acts as a structure-directing agent in the synthesis and provides effective adsorption sites that could be modified to alter the framework properties.

Although the sorption and flexible features of ETS-4 are extraordinary, the available pore volume requires additional cycles during pressure swing adsorption applications. Thus, the present invention provides a novel solution to this problem, by presenting a new titanosilicate called University of Puerto Rico at Mayaguez variant number 5 (UPRM-5) prepared using Tetraethylammonium Hydroxide (TEAOH) as a molecular structure-directing agent (SDA). Although the use of TEAOH is known to have a considerable effect on the nucleation, crystallization and void volume of materials, there are no reports on its use to prepare flexible titanium silicates. In addition, the invention presents a non-destructive detemplation process and two sorbent variants based on strontium ($Sr^{2+}$) and barium ($Ba^{2+}$) cations. UPRM-5 and the ion-exchanged variants have been characterized here via powder X-ray diffraction (XRD), Fourier transform infra-red (FT-IR) spectroscopy, thermal gravimetric analysis (TGA), scanning electron microscopy (SEM) and porosimetry techniques, all aiming at elucidating the structural properties relevant to the material adsorption performance. Adsorption isotherms for $CO_2$, $CH_4$, $N_2$ and $O_2$ on all the strontium- and barium-based sorbent materials as well as $CO_2$ isosteric heat of adsorption on the $Sr^{2+}$ and $Ba^{2+}$ variants are also presented.

SUMMARY OF THE INVENTION

BRIEF DESCRIPTION OF THE DRAWINGS

Further features and advantages of the invention will become apparent from the following detailed description taken in conjunction with the accompanying figures showing illustrative embodiments of the invention, in which.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

Figure 1:
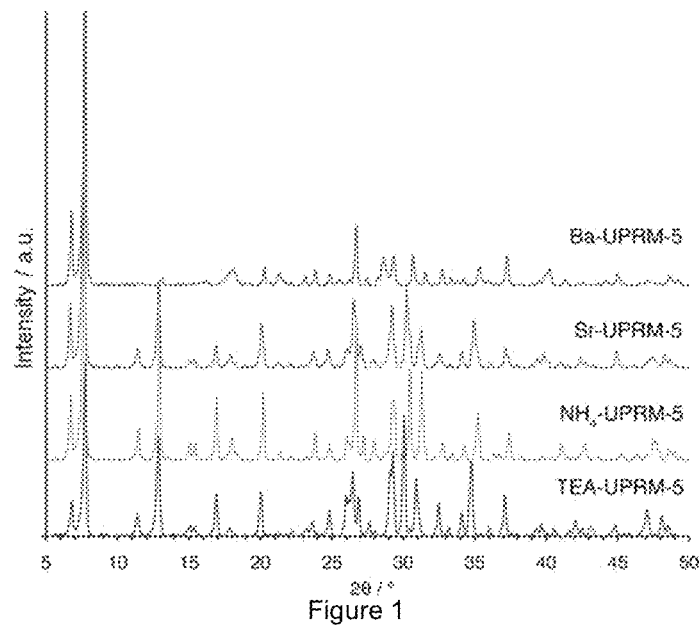
FIG. 1 shows XRD patterns for the detemplated and ion exchanged materials according to the present invention.

A titanium silicate variant named UPRM-5 was prepared using tetraethylammonium hydroxide as a structure-directing agent (SDA). Characterization of the material by scanning electron microscopy (SEM) and X-ray diffraction (XRD) techniques showed a homogeneous and crystalline solid powder phase, with unit cell dimensions of a=6.8 Å, b=11.7 Å, c=13.4 Å, α=102.9°, β=92.8°, γ=91.1°. Successful detemplation was achieved via ion exchange with $NH_4Cl$ as evidenced by thermal gravimetric analysis (TGA) and Fourier transform infrared (FT-IR) spectroscopy data. Effective functionalization was obtained after ion exchanging the detemplated material using $SrCl_2$ and $BaCl_2$. These ion-exchanged variants were also characterized using XRD and porosimetry techniques. Thermal-vacuum activation of Sr-UPRM-5 at 90° C. resulted in a material with a surface area of ca. 240 m$^2$/g while activation at higher temperatures resulted in low surface areas and plausible structural distortion. On the other hand, the barium variant exhibited the best thermal stability, with an average surface area in the order of 250 m$^2$/g after employing activation temperatures up to 180° C. The differences in thermal stability may be a result of structural coordinated water. Adsorption of $CO_2$ at 25° C. in Sr- and Ba-UPRM-5 materials activated at different temperatures also co-corroborated the aforementioned thermal stability observations in addition to what appears to be cation relocation. Fitting of the $CO_2$ adsorption data with the Dubinin-Astakhov model revealed a heterogeneous surface, which was corroborated by isosteric heats of adsorption estimated from the uptake data. For low partial pressures, the observed $CO_2$ adsorption capacities increased as follows: $NH_4$-UPRM-5<Sr-UPRM-5<Ba-UPRM-5. Both the Sr- and Ba-UPRM-5 materials exhibited outstanding selectivity for $CO_2$ over $CH_4$, $N_2$ and $O_2$.

Sorbent Synthesis:

A UPRM-5 crystalline material was prepared via hydrothermal synthesis using TEAOH. In a typical synthesis, 1.88 g of sodium hydroxide pellets (Sigma ultra, 98%) were added to 10.8 mL of sodium silicate solution (27 wt % $SiO_2$), and the resulting mixture was manually agitated until the sodium hydroxide pellets fully dissolved. Afterwards, 1.52 g of potassium fluoride dihydrate (98 wt %) were added to the mixture and agitated until a homogeneous solution was attained. About 5.5 mL of titanium (III) chloride solution (20% in HCl) were added to the mixture drop-wise. The resulting dark colored gel was stirred continuously using a magnetic stirrer at room temperature for 1.5 h. Finally, 16.3 mL of TEAOH (40% TEAOH) were added and the new mixture stirred for 30 min at room temperature until homogeneous (13.80<pH<13.95). The resulting composition formula for the gel was: 3.4 $(TEA)_2O$:7.3$Na_2O$:1.2$K_2O$:1.3$TiO_2$:10.0$SiO_2$:200.0$H_2O$. The gel was transferred to a 50 mL Teflon lined stainless-steel autoclave and maintained at 180° C. under autogenous pressure conditions for 12 days. A clear stagnant liquid and a white solid paste were obtained. The solid was filtered and washed with copious amounts of distilled/deionized water and dried in a forced convection oven at 60° C. for 18 hours.

Detemplation and Preparation of Ion-Exchanged Materials:

In order to remove the SDA, the as-synthesized sorbent material (TEA-UPRM-5) was ion exchanged with a 1M solution of $NH_4Cl$ (100.6%, Fisher) at 80° C. for 24 hours. The detemplated material ($NH_4$-UPRM-5) was functionalized with strontium and barium cations respectively, by also using a liquid phase ion exchange methods. For strontium ion exchange, a three-stage method using $SrCl_2$ (A.C.S. reagent, 99% $SrCl_2.6H_2O$) solution was used. For barium ion exchange, a mixture containing 6 meq/g $BaCl_2$ (99.999% $BaCl_2$) and 10 g of $H_2O$ per gram of detemplated material was mixed and heated at 80° C. for 24 hours. Each ion exchanged material (i.e. $NH_4$-, Sr- or Ba-UPRM-5) was filtered and washed with copious amounts of distilled/deionized water and dried in a forced convection oven at 60° C. for 18 hours. Sr-ETS-4 was prepared by ion-exchanging Na,K-ETS-4 with $SrCl_2$ following the procedure described in the open literature.

TABLE 1

Unit cell composition of as-synthesized UPRM-5 and ion exchanged materials.

| Sorbent | Unit Cell |
|---|---|
| TEA-UPRM-5 | $|TEA_{0.5}{}^+K^+Na_5{}^+|[Si_9Ti_4O_{37}]:9H_2O$ |
| $NH_4$-UPRM-5 | $|(NH_4{}^+)_{2.4}K_{0.2}{}^+Na_{3.9}{}^+|[Si_9Ti_4O_{37}]$ |
| Sr-UPRM-5 | $|Sr_{2.5}{}^{2+}K_{0.1}{}^+Na_{1.4}{}^+|[Si_9Ti_4O_{37}]$ |
| Ba-UPRM-5 | $|Ba_{1.8}{}^{2+}K_{0.1}{}^+Na_{2.9}{}^+|[Si_9Ti_4O_{37}]$ |

Adsorption Equilibrium Isotherms and Uptake Rates.

$NH_4$-, Sr- and Ba-UPRM-5 sorbent materials were tested for carbon dioxide adsorption at 25° C. and pressures up to 1 atm. The analysis was also performed using the volumetric adsorption apparatus previously mentioned and $CO_2$ gas (Ultra High Purity Grade). Before each analysis, the Sr- and Ba-UPRM-5 sorbents were activated following the procedure described above. $NH_4$-UPRM-5 samples were activated at 90° C. Equilibrium adsorption isotherms of other light gases including methane (Ultra High Purity Grade), nitrogen (Ultra High Purity Grade) and oxygen (Ultra High Purity Grade) were gathered only for Sr- and Ba-UPRM-5 sorbents at 25° C.

Results:

Sample Crystallinity and Morphology.

As-synthesized UPRM-5 has a crystalline structure that deviates considerably from that of other titanosilicates that are polymorphs of Zorite and even others that are not. This is evident in the XRD patterns shown in FIG. 1, which differs considerably from that of the other titanosilicates previously referenced. A preliminary indexing analysis for UPRM-5 indicates that the unit cell dimensions could be described by a Triclinic system with a=6.8 Å, b=11.7 Å, c=13.4 Å, α=102.9°, β=92.8° and γ=91.1°.

XRD patterns for the detemplated and ion exchanged materials (see FIG. 1) suggest that the inclusion of different extra-framework species induces some structural changes. Although the crystallinity is generally preserved in both the $NH_4$- and Sr-UPRM-5 samples, some small peak displacement was observed in the 25-35° range. Since the peaks are shifting in both directions (i.e., higher and lower d spacing), the results suggest that the inclusion of different cations affect the coordination of titanium and/or structural water species resulting this in some degree of structural distortion. Ba-UPRM-5 samples meanwhile exhibit considerable lost in peak intensity (10-25° range) when compared to that of the as-synthesized material. All these observations could be direct result of the ion exchange temperature and/or pH. In addition, they could be attributed to the replacement of the as-synthesized material cations with $NH_4{}^+$, $Sr^{2+}$ or $Ba^{2+}$.

TGA, FT-IR and Framework Composition.

Figure 2:
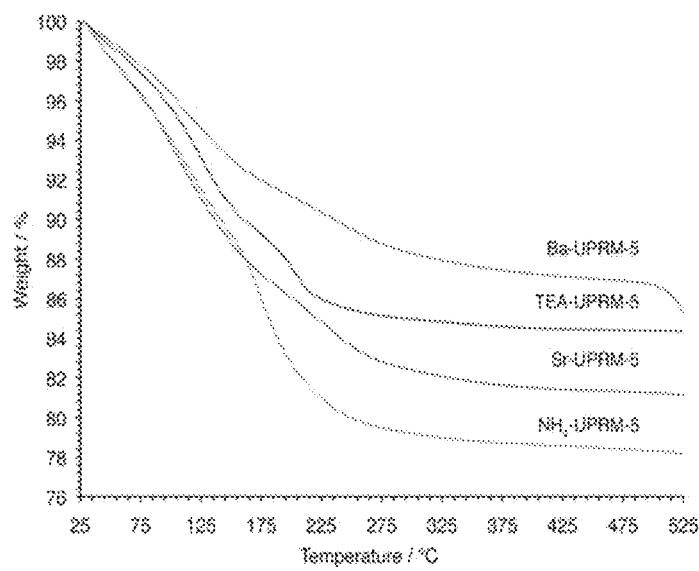
FIG. 2 shows weight loss profiles for the detemplated and ion exchanged materials according to the present invention.

Weight loss profiles (FIG. 2) where gathered for all of the UPRM-5 variants. In the case of the as-synthesized material, the profile shows an inflection between 25° C. and 160° C.

which corresponds to water weakly bound to the structure. A secondary inflection present in the 175° C.-525° C. range was been assigned to the SDA thermal elimination. Although this region is absent in the other variants, which is a strong indication of successful detemplation, the observed difference in total weight loss among the detemplated UPRM-5 variants is probably due to the amount of water molecules coordinated to the framework and to extra-framework species, in addition to ammonia in the case of $NH_4$-UPRM-5.

Figure 3:
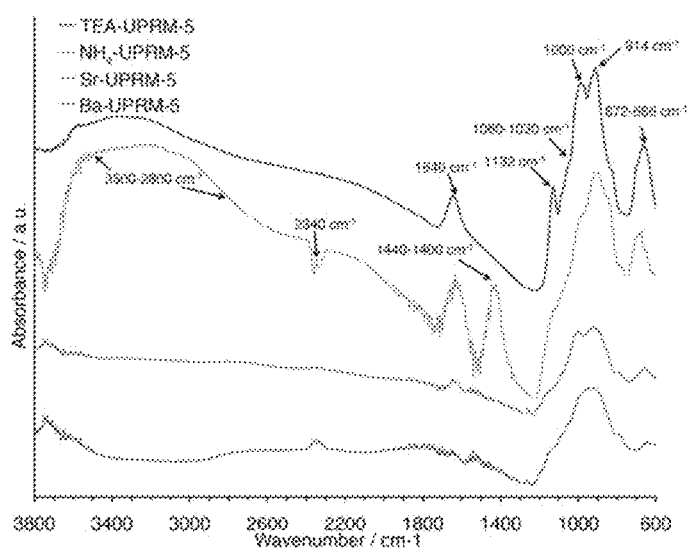
FIG. 3 shows absorbance profiles for the detemplated and ion exchanged materials according to the present invention.

Further corroboration of successful detemplation was achieved via FT-IR spectroscopy analyses. Quaternary ammonium salts like TEAOH cations are characterized by $NC_4$ skeletal stretching and this observation is present in the IR spectrum of the as-synthesized UPRM-5 (see FIG. 3). The bands observed in the 1060-1030 $cm^{-1}$ and 672-666 $cm^{-1}$ regions correspond to antisymmetric and symmetric $NC_4$ stretching, respectively, confirming the presence of the SDA moiety. Additional bands corresponding to the template are those observed at 914 and 1000 $cm^{-1}$ for C—N stretching and 1132 $cm^{-1}$ for C—N—C antisymetric stretching. Meanwhile, the IR spectra of $NH_4$-, Sr- and Ba-UPRM-5 samples still show some bands on the 1400-650 $cm^{-1}$ region but with much less intensity. These are due to symmetric and asymmetric stretching of the $TO_4$ tetrahedra and not due to the SDA molecules, which confirms detemplation. The bands observed in the 3500-2800 $cm^{-1}$ and 1440-1400 $cm^{-1}$ regions of the $NH_4$-UPRM-5 IR spectrum are due to the stretching and deformation vibrations of the $NH_4^+$ cations, respectively. These regions disappear when the $NH_4$-UPRM-5 material is ion exchanged with strontium or barium cations. It should be mentioned that the bands present at 2340 and 1640 $cm^{-1}$ are related to $CO_2$ and water, respectively, present in the materials.

Elemental compositional data of the samples was obtained from a combination of experimental methods, including TGA, ICP, and EDX, and the results are compiled in Table 1. The as-synthesized material has about 0.5 SDA molecules per unit cell (see Table 1), which are protonated and offer counterbalancing of negative charges brought by the framework. Nevertheless, the titanium-silicate framework still requires additional counterbalancing charges which are supplied here by sodium and potassium cations. Table 1 also shows the compositional data for the detemplated and strontium/barium exchanged materials. Since ion exchanges are not expected to change the framework metal content, it was assumed that the Si and Ti amounts remained constant. In general, the ion exchange procedures resulted in complete removal of the SDA and partial exchange of the alkali metal cations present in the as-synthesized UPRM-5.

Effect of Activation Temperature on Surface Area.

Figure 4:
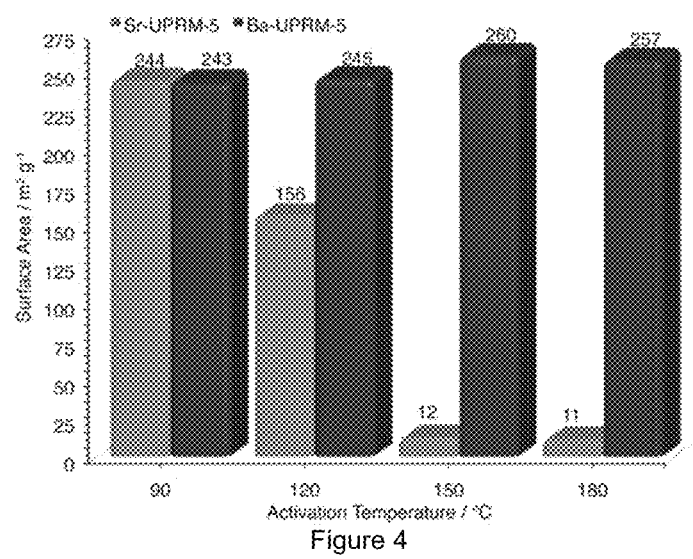
FIG. 4 shows comparison plots of activation temperatures vs. surface area for the ion-exchanged materials according to the present invention.

One particular feature of ETS-4 materials is the structure shrinkage upon increasing the activation or degassing temperature. For instance, the reported surface areas for the as-synthesized (hydrated) and thermally activated (@ 200° C.) ETS-4 materials are 19 and 12 $m^2/g$, respectively. A similar but more prominent feature was observed in Sr-UPRM-5 materials, where the surface area decreases from 244 to 11 $m^2/g$ when the activation temperature is increased to about 180° C. (see FIG. 4). However, it is important to notice that the surface areas reported here were obtained from $N_2$ adsorption isotherms gathered at −196° C. tests and hence the values correspond to what such probe molecule is able to access. In other words, if the pore dimensions are close or less than the probe molecule kinetic diameter the reported area will be perhaps smaller than the actual value. For the Ba-UPRM-5 variant, however, it appears that the inclusion of barium cations enhances the stability of the material in a considerable fashion. In fact, the surface area increases an average of 7% upon increasing the activation temperature. This behavior is probably a result of stronger water coordination as evident from the TGA tests (see FIG. 2). Increasing the temperature to ca. 240° C. results in a Ba-UPRM-5 surface area of ca. 45 $m^2/g$ (result not shown in FIG. 4), which can be attributed to nearly complete framework shrinkage. It should be mentioned that the as-synthesized UPRM-5 sorbent has a surface area of ca. 61 $m^2/g$ after activation at 90° C., further supports that the SDA is present on the structure and that it occupies most if not all of the pore volume.

Adsorption Isotherms and Isosteric Heat of Adsorption.

Figure 5:
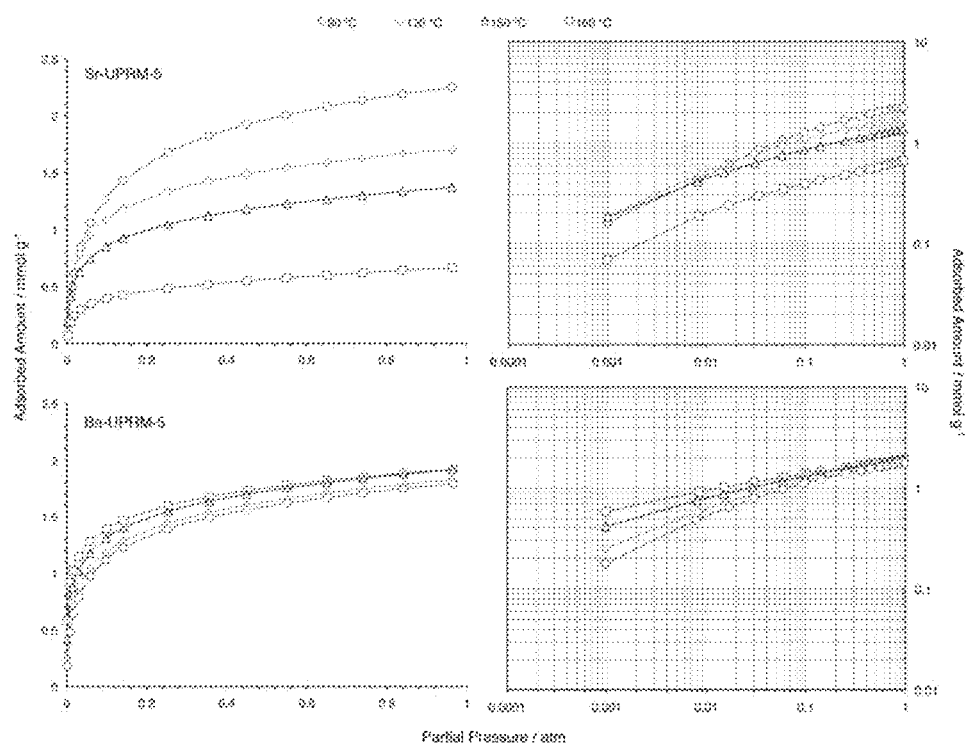
FIG. 5 shows plots summarizing measurements of pure component $CO_2$ adsorption isotherms measured on Sr- and Ba-UPRM-5 according to the present invention.

Pure component $CO_2$ adsorption isotherms were measured on Sr- and Ba-UPRM-5 at 25° C. after activation of the sorbents at different temperatures and the data is summarized in FIG. 5. Careful attention was given to data gathering at low partial pressures in order to analyze the sorbate-sorbent interaction levels in a qualitative way. Given the rectangular shape of the isotherms, which is an excellent indicator of strong interactions, it was necessary to plot the data also in log-log scale in order to appreciate the differences in loading amounts among the metal exchanged UPRM-5 variants. For the case of Sr-UPRM-5, the low-pressure region does not show appreciable difference in loading amounts, with the exception of data for the material activated at 180° C. It appears that at this activation temperature the pore width of the strontium-based material has been reduced dramatically, blocking or offering considerable resistance to diffusion of $CO_2$. A similar behavior was expected after employing an activation temperature of 150° C. since the material surface area as reported by $N_2$ probe molecules is ca. 12 $m^2/g$. One possible explanation for the observed higher $CO_2$ loading at this condition could be the result of the smaller kinetic diameter of this sorbate when compared to that of $N_2$.

Analysis of the higher-pressure range clearly shows that there is a pore volume contraction in Sr-UPRM-5 when activated at different temperatures, which is typical in many titanosilicates with multi-coordinated framework titanium. It is concluded after the analysis that the best activation temperature for Sr-UPRM-5 in order to achieve the highest $CO_2$ adsorption capacities is 90° C.

$CO_2$ adsorption analysis at low pressure for the barium-based materials activated at different temperatures indicates that the ultimate sorbate-sorbent interactions are affected by the sorbent pre-treatment temperature choice. As shown in FIG. 5, an increase in activation temperature results in higher loadings in the prescribed pressure region. One possible explanation of this behavior is the presence of framework-coordinated water after activation of the sorbent at lower temperatures. TGA data (see FIG. 2) for Ba-UPRM-5 indicates that the moisture content of the material is released in a step-wise fashion, which indeed evidences the presence of water with different coordination stages. This explains why an activation temperature of 180° C. results in higher $CO_2$ loadings at low pressure and 25° C. It is plausible that a considerable amount of water molecules is coordinated to $Ba^{2+}$ cations, which require higher activation temperatures in order to allow the metal to be exposed to interact with other hosts. In addition, the ultimate cation location is known to be a function of activation temperature and hence will affect the degree of exposure of a particular adsorption site. Adsorption of $CO_2$ at higher pressure shows almost no difference in equilibrium loading for each sorbent activation temperature being this evidence of a remarkable thermal stability brought by the presence of barium ions. It is concluded after the analysis that the best activation temperature for Ba-UPRM-5 in order to achieve the highest $CO_2$ adsorption capacities should be approximately 180° C.

Figure 6:
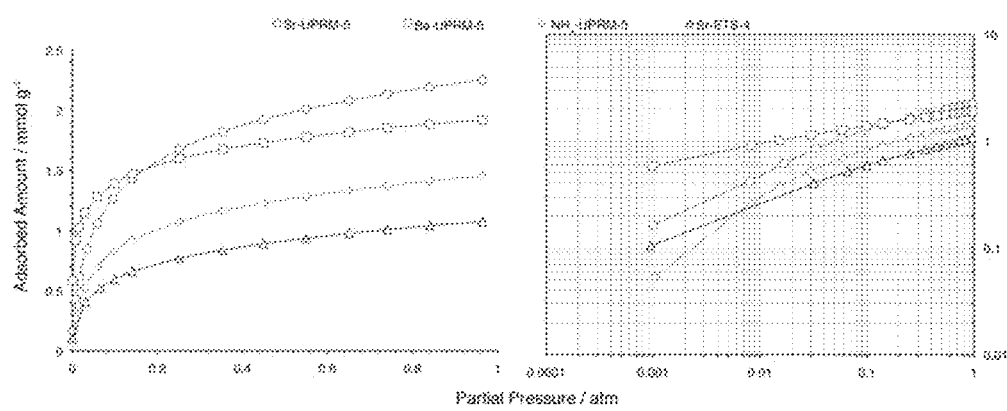
FIG. 6 shows plots comparing $CO_2$ equilibrium isotherms for all the detemplated variants according to the present invention.

FIG. 6 compares $CO_2$ equilibrium isotherms for all the detemplated variants thermally treated at their corresponding optimum activation temperature. In addition, the figure includes data for $CO_2$ adsorption on Sr-ETS-4 material activated at 90° C. Although the ETS-4 sorbent activation temperature was chosen to establish a direct comparison with the results obtained for the Sr-UPRM-5 sorbent, it is critical to keep in mind that the amount of structural or tenacious water in Sr-ETS-4 at this condition is considerable (FIG. 3) and could affect the adsorption behavior. In fact, an analysis by Marathe, Farooq and Srinivasan concluded that the difussional hindrance observed in Sr-ETS-4 decreases with activation temperature. Notwithstanding, data recently reported by Rodrigues and co-workers for $CO_2$ equilibrium isotherms on Sr-ETS-4 at pressures up to ca. 6 atm and gathered using different activation temperatures indicate that the loading amounts at low partial pressure where almost invariant to choice of activation temperature.

According to the data shown in FIG. 6, the $CO_2$ interaction at low partial pressures increases as follows: $NH_4$-UPRM-5<Sr-ETS-4<Sr-UPRM-5<Ba-UPRM-5. Although the barium-based UPRM-5 sorbent offers remarkable sorption capacity at low pressures, the strontium counterpart excels at saturation capacity, plausibly due to water molecules displacement by the $CO_2$. According to FIG. 3 the amount of coordination water available in Sr-UPRM-5 is greater than that of the barium-based counterpart, especially at temperatures equal or greater than 90° C., which probably explains the observed $CO_2$ isotherm behavior. Comparison of the $CO_2$ loadings among the strontium-based sorbents indicates that the use of TEAOH during the synthesis of the titanium silicate indeed has an effect of the ultimate framework characteristics, including larger void volume.

Figure 7:
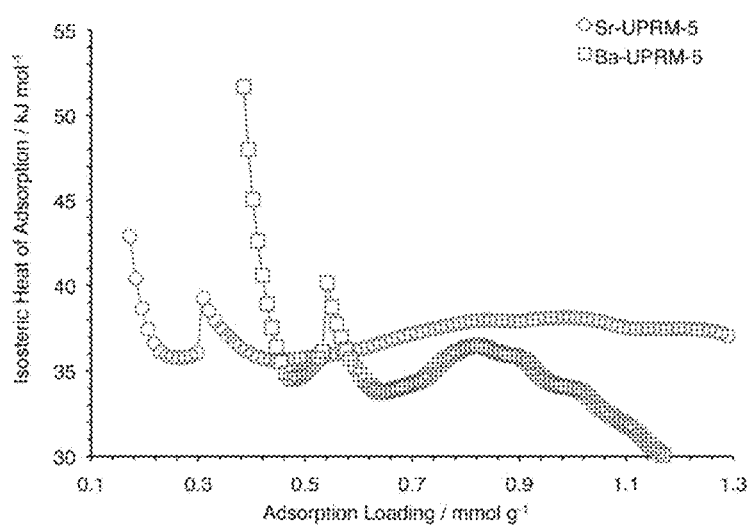
FIG. 7 shows plots for $CO_2$ isosteric heats of adsorption profiles for Sr- and Ba-UPRM-5 according to the present invention.

$CO_2$ isosteric heats of adsorption profiles for Sr- and Ba-UPRM-5 activated at 90 and 180° C., respectively, are shown in FIG. 7. These were used to estimate the interaction range as well as the degree of heterogeneity. Both sorbents show physisorption level interactions with $CO_2$ with maximum values of 43 and 52 kJ/mol for Sr-UPRM-5 and Ba-UPRM-5, respectively, and high degree of heterogeneity. Using the data shown in Table 1, the observed peak energy values correspond to about 0.4 and 0.7 $CO_2$ molecules adsorbed per strontium and barium cation, respectively. As the sorbate loading is increased the interactions probably occur with the remaining cationic species, including sodium and potassium. This again evidences that for the former case not all of the strontium ions are available for interaction, probably due to the presence of metal coordinated water molecules. It should be mentioned that similar $CO_2$ adsorption energy trends have been observed reported by Hernandez-Maldonado and co-workers for strontium and barium based SAPO-34 sorbents. They also concluded from DFT studies that such values correspond to a bond of ionic character.

Figure 8:
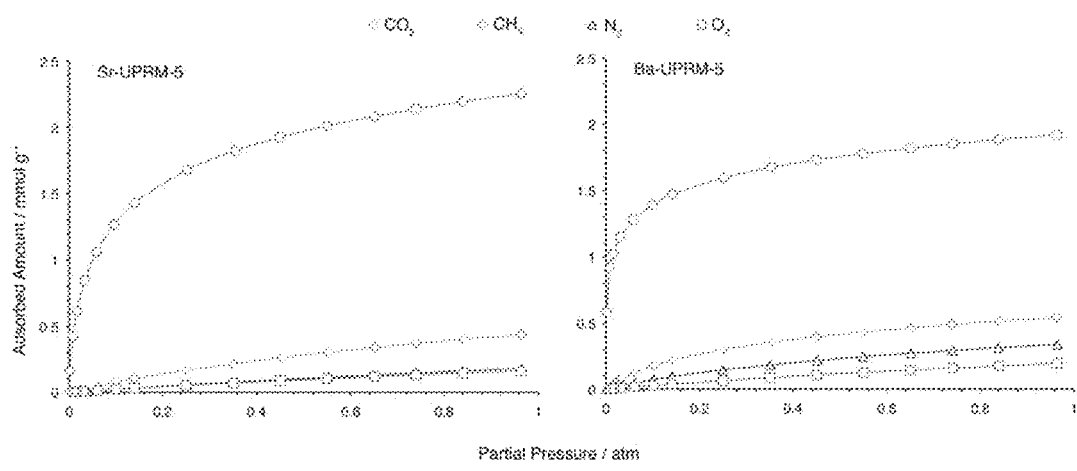
FIG. 8 shows plots for the detemplated variants indicating selective towards $CO_2$ according to the present invention.

Single component equilibrium adsorption isotherms for $CH_4$, $N_2$ and $O_2$ were also measured at 25° C. for the Sr- and Ba-UPRM-5 sorbents activated at 90 and 180° C., respectively. FIG. 8 shows that both materials are quiet selective towards $CO_2$, which could be due to a combination of size exclusion and surface interaction principles. All four gases have electrostatic-related properties, which will lead to similar non-specific level interactions. Carbon dioxide, however, has strong quadrupole moment that could interact with the cation site electric and enhance the interactions. The quadrupole moment value for $CO_2$ is $-4.3 \times 10^{-26}$ erg$^{1/2}$ cm$^{5/2}$, which is three times larger than that of $N_2$ and an order of magnitude larger than that of $O_2$. Methane does not have a quadrupole moment. Also, the observed $CH_4$ adsorbed amounts are larger compared to those obtained for $N_2$ and $O_2$ and could be attributed to the induced octopole moment that $CH_4$ exhibits when in contact with the electric field generated by the cations and its slightly large polarizability.

In terms of adsorbent regeneration, the $CO_2$ uptake in both the strontium and barium variants is completely reversible upon application of vacuum (data not shown here). This correlates with the isosteric heats of adsorption, which are in the physisorption range. At this stage it appears that these materials could be suitable for $CO_2$ removal applications without being energy intensive.

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

We claim:

1. A method of synthesizing a titanosilicate material comprising:
adding sodium hydroxide to a sodium silicate solution and agitating said mixture until the sodium hydroxide is fully dissolved;
adding potassium fluoride dihydrate to said mixture and agitating until a homogeneous solution is formed;
adding dropwise a solution of titanium (III) chloride in HCl to said homogeneous solution;
adding to said resulting mixture tetraethylammonium hydroxide (TEAOH) as a molecular directing agent that allows the formation of a porous adsorbent material, agitating said resulting mixture and said TEAOH until homogeneously forming a new gel reaction mixture having a pH value of greater than 13.80 and less than 13.95 wherein the gel mixture comprises a composition having a formula of 3.4(TEA)$_2$O:7.3Na$_2$O:1.2K$_2$O:1.3TiO$_2$: 10.0SiO$_2$:200.0H$_2$O; and crystallizing said new gel mixture to form a titanosilicate porous material;
removing said molecular structure-directing directing agent from a resulting mixture via ion exchange with a solution of NH4Cl to form a detemplated material;
functionalizing said detemplated material with barium or strontium cation via ion exchange to form a titanosilicate porous material having a surface area that varies as a function of thermal activation temperature.

2. The method of claim 1, wherein said new gel mixture is maintained under autogenous pressure conditions for no less than 12 days until a clear stagnant liquid and a white solid paste are obtained.

3. The method of claim 1, wherein said functionalized detemplated material exhibits selectivity for $CO_2$.

4. The method of claim 1, wherein said titanosilicate material has a structure based on a triclinic system.

* * * * *

UNITED STATES PATENT AND TRADEMARK OFFICE
CERTIFICATE OF CORRECTION

PATENT NO. : 8,440,166 B1  
APPLICATION NO. : 13/071465  
DATED : May 14, 2013  
INVENTOR(S) : Hernandez-Maldonado et al.

Page 1 of 1

It is certified that error appears in the above-identified patent and that said Letters Patent is hereby corrected as shown below:

On the Title Page, Item (54) and in the specification, Column 1, Title: replace the word "absorbent" with the word -adsorbent-.

Signed and Sealed this
Eleventh Day of June, 2013

Teresa Stanek Rea
*Acting Director of the United States Patent and Trademark Office*